(12) United States Patent
Akah

(10) Patent No.: US 11,578,272 B1
(45) Date of Patent: Feb. 14, 2023

(54) PROCESSES AND SYSTEMS FOR PRODUCING LIGHT OLEFINS AND AROMATICS FROM A MIXED PLASTICS STREAM

(71) Applicant: Saudi Arabian Oil Company, Dhahran (SA)

(72) Inventor: Aaron Chi Akah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/672,899

(22) Filed: Feb. 16, 2022

(51) Int. Cl.
| | |
|---|---|
| C10G 1/10 | (2006.01) |
| C10G 1/00 | (2006.01) |
| C10G 11/00 | (2006.01) |
| C10G 19/073 | (2006.01) |
| B01D 53/68 | (2006.01) |
| B01D 53/77 | (2006.01) |

(52) U.S. Cl.
CPC .............. *C10G 1/10* (2013.01); *B01D 53/68* (2013.01); *B01D 53/77* (2013.01); *C10G 1/002* (2013.01); *C10G 11/00* (2013.01); *C10G 19/073* (2013.01); *B01D 2251/604* (2013.01); *B01D 2257/2045* (2013.01); *B01D 2258/02* (2013.01); *C10G 2300/1003* (2013.01); *C10G 2300/201* (2013.01); *C10G 2300/301* (2013.01); *C10G 2400/20* (2013.01); *C10G 2400/30* (2013.01)

(58) Field of Classification Search
CPC .......... C10G 1/10; C10G 1/002; C10G 11/00; C10G 19/073; C10G 2300/1003; C10G 2300/201; C10G 2300/301; C10G 2400/20; C10G 2400/30; B01D 53/68; B01D 53/77; B01D 2251/604; B01D 2257/2045; B01D 2258/02
See application file for complete search history.

(56) References Cited

U.S. PATENT DOCUMENTS

| | | | |
|---|---|---|---|
| 5,841,011 A | * | 11/1998 | Hashimoto .............. C10G 1/10 201/2.5 |
| 6,346,220 B1 | | 2/2002 | Kosugi et al. |
| 6,861,568 B1 | | 3/2005 | Guffey et al. |
| 7,932,424 B2 | | 4/2011 | Fujimoto et al. |
| 8,350,104 B2 | | 1/2013 | Fujimoto et al. |
| 8,420,875 B1 | | 4/2013 | Mackay et al. |
| 8,927,797 B2 | | 1/2015 | Sarker |

(Continued)

*Primary Examiner* — Thuan D Dang
(74) *Attorney, Agent, or Firm* — Dinsmore & Shohl LLP

(57) ABSTRACT

Methods and systems for producing aromatics and light olefins from a mixed plastics stream are described. The method may include feeding a plastic feedstock to a dechlorination operation to melt the plastic feedstock to release HCl and generate a liquid plastic stream; feeding the liquid plastic stream to a pyrolysis reactor, the pyrolysis reactor to generate hydrocarbon vapors; feeding the hydrocarbon vapors to an acid gas removal reactor with a solid inorganic alkali salt disposed within the reaction vessel to remove residual HCl and sulfur-containing compounds from the hydrocarbon vapors to generate a plastic derived oil; and feeding the plastic derived oil to a steam enhanced catalytic cracking reactor to generate a product stream comprising light olefins having a carbon number of $C_2$-$C_4$ and aromatics. The associated system for processing mixed plastics into aromatics and light olefins is also described.

12 Claims, 3 Drawing Sheets

(56) References Cited

U.S. PATENT DOCUMENTS

| | | |
|---|---|---|
| 9,404,046 B2 | 8/2016 | Sarker |
| 10,093,860 B2 | 10/2018 | Griffiths |
| 10,246,643 B2 | 4/2019 | Gephart et al. |
| 10,717,934 B2 | 7/2020 | Griffiths |

* cited by examiner

PROCESSES AND SYSTEMS FOR PRODUCING LIGHT OLEFINS AND AROMATICS FROM A MIXED PLASTICS STREAM

BACKGROUND

Field

The present disclosure generally relates to processes and systems for producing aromatics and light olefins from a mixed plastics stream, and more specifically, to processes and systems to producing aromatics and light olefins from a mixed plastics stream through steam enhanced catalytic cracking of plastic derived oil having undergone removal of acidic gases and contaminants.

Technical Background

Plastic is a synthetic or semisynthetic organic polymer composed of mainly carbon and hydrogen. Further, plastics tend to be durable, with a slow rate of degradation, therefore they stay in the environment for a long time and are not prone to rapid breakdown upon disposal. Pure plastics are generally insoluble in water and nontoxic. However, additives used in plastic preparation are toxic and may leach into the environment. Examples of toxic additives include phthalates. Other typical additives include fillers, colorant, plasticizers, stabilizers, anti-oxidants, flame retardants, ultraviolet (UV) light absorbers, antistatic agents, blowing agents, lubricants used during its preparation to change its composition and properties.

Plastics pyrolyze at high temperatures and polymers can be converted back to their original monomers or smaller polymers as gas or liquid and can be recovered. However, the additives added to the plastic during production present challenges in effectively utilizing the recovered products from pyrolysis. Upon pyrolysis, the additives end-up in the pyrolysis products and thus require further processing to generate feed streams for conversion useful products.

BRIEF SUMMARY

Accordingly, there is a clear and long-standing need to provide a solution to utilize the pyrolysis products generated from the pyrolysis of plastics. To utilize such pyrolysis products the additives must be removed prior to pyrolysis or the residue left from the additives in the pyrolysis product must be removed before further processing into useful products. The present disclosure addresses such long-standing need for the disposal of plastics and utilization of pyrolysis products generated from the pyrolysis of plastics by utilizing generated plastic derived oil treated to remove acid gases and other contaminants as feedstock for steam enhanced catalytic cracking.

In accordance with one embodiment of the present disclosure, a method of producing aromatics and light olefins from a mixed plastics stream includes (a) feeding a plastic feedstock to a dechlorination operation, the dechlorination operation including (i) raising the temperature of the plastic feedstock to a temperature between 250 and 350° C. to melt the plastic feedstock and generate a liquid plastic stream and (ii) scrubbing HCl released from the liquid plastic stream (b) feeding the liquid plastic stream processed in the dechlorination operation to a pyrolysis reactor, the pyrolysis reactor raising the temperature of the liquid plastic stream to a temperature of 300 to 1,000° C. to generate hydrocarbon vapors; (c) feeding the hydrocarbon vapors to an acid gas removal reactor, the acid gas removal reactor comprising a reaction vessel with a solid inorganic alkali salt disposed within the reaction vessel, where the solid inorganic alkali salt removes residual HCl and sulfur-containing compounds from the hydrocarbon vapors to generate a plastic derived oil; and (d) feeding the plastic derived oil to a steam enhanced catalytic cracking reactor operated at 600 to 700° C. where the plastic derived oil is cracked to generate a product stream comprising light olefins having a carbon number of $C_2$-$C_4$ and aromatics.

In accordance with another embodiment of the present disclosure, a system for processing mixed plastics into aromatics and light olefins includes an inlet stream comprising mixed plastics, a dechlorination unit, a pyrolysis reactor, an acid gas removal reactor, and a steam enhanced catalytic cracking reactor. The dechlorination unit is in fluid communication with the inlet stream and operable to (i) raise the temperature of the inlet stream to a temperature between 250 and 350° C. to melt the mixed plastics and generate a liquid plastic stream and (ii) scrub HCl released from the inlet stream. The pyrolysis reactor is in fluid communication with the liquid plastic stream discharged from the dechlorination unit and operable to raise the temperate of the liquid plastic stream to a temperature of 300 to 1,000° C. to generate hydrocarbon vapors. The acid gas removal reactor is in fluid communication with the pyrolysis reactor and operable to remove residual HCl and sulfur-containing compounds from the hydrocarbon vapors to generate a plastic derived oil, where the acid gas removal reactor comprises a reaction vessel with a solid inorganic alkali salt disposed within the reaction vessel. The steam enhanced catalytic cracking reactor is in fluid communication with the acid gas removal reactor and operable to crack the plastic derived oil at 600 to 700° C. to generate a product stream comprising light olefins having a carbon number of $C_2$-$C_4$ and aromatics Additional features and advantages of the technology disclosed herein will be set forth in the detailed description which follows, and in part will be readily apparent to those skilled in the art from that description or recognized by practicing the technology as described herein, including the detailed description which follows, the claims, as well as the appended drawings.

It is to be understood that both the foregoing general description and the following detailed description present embodiments of the technology, and are intended to provide an overview or framework for understanding the nature and character of the technology as it is claimed. The accompanying drawings are included to provide a further understanding of the technology, and are incorporated into and constitute a part of this specification. The drawings illustrate various embodiments and together with the description serve to explain the principles and operations of the technology. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
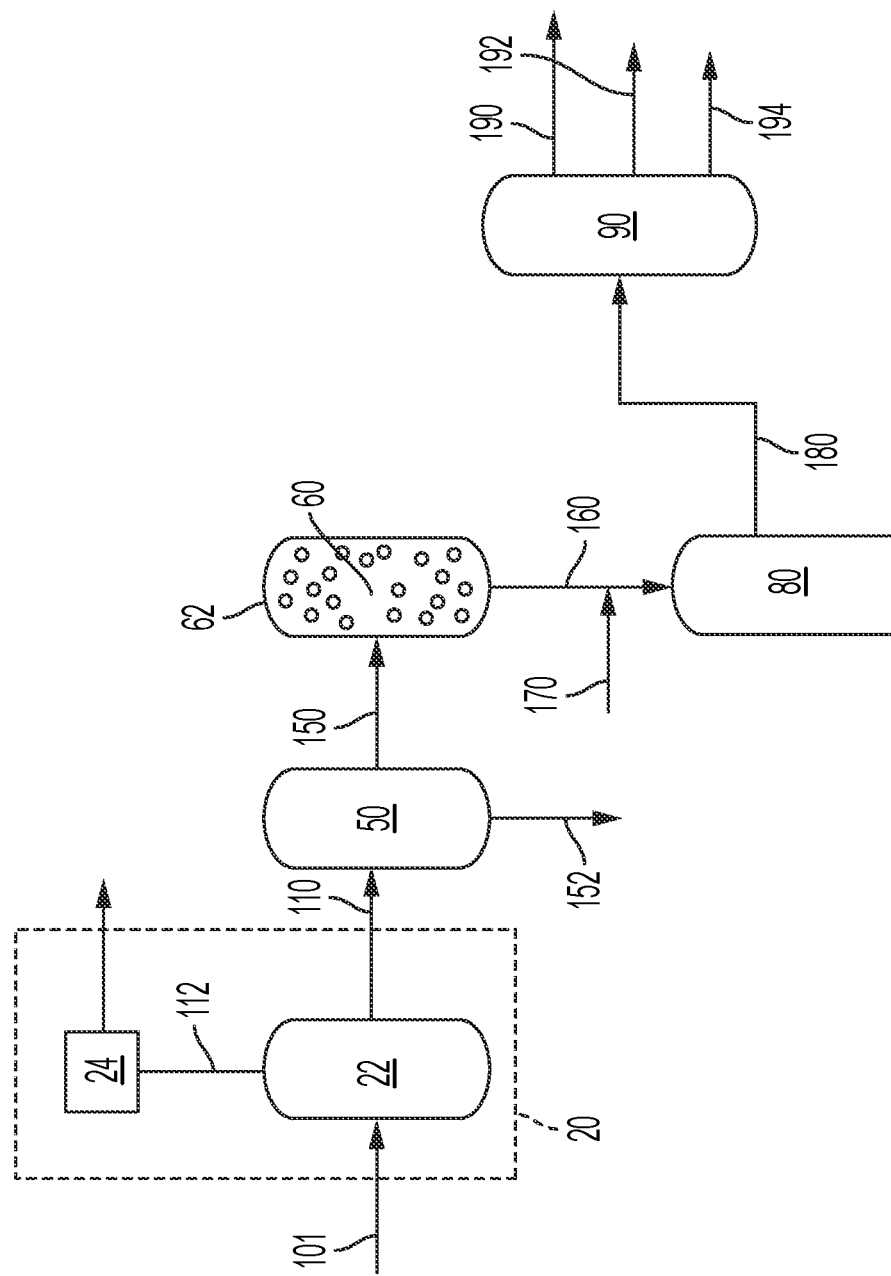
FIG. 1 is a schematic illustration of one or more embodiments of the present disclosure, in which a plastic feedstock is converted to light olefins and aromatics via pyrolysis and steam enhanced catalytic cracking.

For the purpose of this simplified schematic illustration and description, the numerous valves, temperature sensors, electronic controllers and the like that are customarily employed and well known to those of ordinary skill in the art of certain refinery operations are not included. Further, accompanying components that are in conventional refinery operations including FCC processes such as, for example, air supplies, catalyst hoppers, and flue gas handling are not necessarily shown.

It should further be noted that arrows in the drawings refer to pipes, conduits, channels, or other physical transfer lines that connect by fluidic communication one or more system apparatuses to one or more other system apparatuses. Additionally, arrows that connect to system apparatuses define inlets and outlets in each given system apparatus.

DETAILED DESCRIPTION

Reference will now be made in greater detail to various embodiments, some embodiments of which are illustrated in the accompanying drawings. Whenever possible, the same reference numerals will be used throughout the drawings to refer to the same or similar parts. Generally, disclosed herein are various embodiments of systems and methods for producing aromatics and light olefins from a mixed plastics stream through generation of a plastic derived oil via pyrolysis of a plastic feedstock and cracking the plastic pyrolysis oil in an integrated steam enhanced catalytic cracking unit. The plastic derived oil is cleaned of sulfur-containing and chlorine-containing compounds prior to cracking in the integrated steam enhanced catalytic cracking unit.

As used herein, "light olefin" refers to olefins having a carbon number of $C_2$-$C_4$ including ethylene, propylene, and butylenes.

As used herein, "aromatics" refers to molecules with a planar unsaturated ring of atoms including benzene, toluene, and xylene.

A method of producing aromatics and light olefins from a mixed plastics stream includes feeding a plastic feedstock to a dechlorination operation including raising the temperature of the plastic feedstock to a temperature between 250 and 350° C. to melt the plastic feedstock and generate a liquid plastic stream and scrubbing released HCl from the liquid plastic stream. The method of producing aromatics and light olefins from a mixed plastics stream further includes feeding the liquid plastic stream processed in the dechlorination operation to a pyrolysis reactor to raise the temperature of the liquid plastic stream to a temperature of 300 to 1,000° C. to generate hydrocarbon vapors. Subsequently, the method of producing aromatics and light olefins from a mixed plastics stream includes feeding the hydrocarbon vapors to an acid gas removal reactor. The acid gas removal reactor includes a reaction vessel with a solid inorganic alkali salt disposed within the reaction vessel which is operable to remove residual HCl and sulfur-containing compounds from the hydrocarbon vapors to generate a plastic derived oil. Finally, the method of producing aromatics and light olefins from a mixed plastics stream includes feeding the plastic derived oil to a steam enhanced catalytic cracking reactor operated at 600 to 700° C. where the plastic derived oil is cracked to generate a product stream comprising light olefins having a carbon number of $C_2$-$C_4$ and aromatics.

The associated system for processing mixed plastics into aromatics and light olefins includes an inlet stream comprising mixed plastics, a dechlorination unit, a pyrolysis reactor, an acid gas removal reactor, and a steam enhanced catalytic cracking reactor. The dechlorination unit is provided in fluid communication with the inlet stream and is operable to raise the temperature of the inlet stream to a temperature between 250 and 350° C. to melt the mixed plastics and generate a liquid plastic stream and to scrub HCl released from the liquid plastic stream of melted mixed plastics in the inlet stream. The pyrolysis reactor is provided in fluid communication with the liquid plastic stream discharged from the dechlorination unit and is operable to raise the temperate of the liquid plastic stream to a temperature of 300 to 1,000° C. to generate hydrocarbon vapors. The acid gas removal reactor is provided in fluid communication with the pyrolysis reactor and is operable to remove residual HCl and sulfur-containing compounds from the hydrocarbon vapors to generate a plastic derived oil. Further, the acid gas removal reactor comprises a reaction vessel with a solid inorganic alkali salt disposed within the reaction vessel. The steam enhanced catalytic cracking reactor is provided in fluid communication with the fluid acid gas removal reactor and a steam feed and is operable to crack the plastic derived oil at 600 to 700° C. to generate a product stream comprising light olefins having a carbon number of $C_2$-$C_4$ and aromatics.

Having generally described the various embodiments of systems and methods for producing aromatics and light olefins from a mixed plastics stream through generation of a plastic derived oil via pyrolysis of a plastic feedstock and cracking the plastic pyrolysis oil in an integrated steam enhanced catalytic cracking unit, embodiments of the same are described in further detail and with reference to the various Figures.

Referring to FIG. 1, a schematic illustration of one or more generalized embodiments of the present disclosure is presented. An inlet stream 101 comprising mixed plastics is provided to a dechlorination unit 20. The dechlorination unit 20 is in fluid communication with the inlet stream 101 and is operable to raise the temperature of the inlet stream 101 to a temperature between 250 and 350° C. to melt the mixed plastics and generate a liquid plastic stream 110 and scrub HCl released from the melted mixed plastics of the inlet stream 101. A pyrolysis reactor 50 is provided in fluid communication with the liquid plastic stream 110 discharged from the dechlorination unit 20. The pyrolysis reactor 50 is operable to raise the temperate of the liquid plastic stream 110 to a temperature of 300 to 1,000° C. to generate hydrocarbon vapors 150. The pyrolysis reactor 50 may alternatively be referenced as the plastic pyrolysis unit 50. An acid gas removal reactor 60 is provided in fluid communication with the pyrolysis reactor 50 and is operable to remove residual HCl and sulfur-containing compounds from the hydrocarbon vapors 150 as a waste stream 162 to generate a plastic derived oil 160. The acid gas removal reactor 60 comprises a reaction vessel 62 with a solid inorganic alkali salt 64 disposed within the reaction vessel 62. A steam enhanced catalytic cracking reactor 80 is provided in fluid communication with the acid gas removal reactor 60 and a steam feed 170 and is operable to crack the plastic derived oil 160 to generate a product stream 180 comprising light olefins having a carbon number of $C_2$-$C_4$ and aromatics.

Plastic Feedstock

In one or more embodiments, the inlet stream 101 comprises a plastic feedstock including mixed plastics of differing compositions. The plastic feedstock provided to the pyrolysis reactor 50 may be a mixture of plastics from various polymer families. In various embodiments, the plastic feedstock may comprise plastics representative of one or more of the polymer families disclosed in Table 1. Specifically, the plastic feedstock may comprise plastics representative of one or more of olefins, carbonates, aromatic polymers, sulfones, fluorinated hydrocarbon polymers, chlorinated hydrocarbon polymers, and acrylonitriles. Further, the plastic feedstock provided to the plastic pyrolysis unit 151 may be a mixture of high density polyethylene (HDPE, for example, a density of about 0.93 to 0.97 grams per cubic centimeter (g/cm$^3$), low density polyethylene (LDPE, for example, about 0.910 g/cm$^3$ to 0.940 g/cm$^3$), polypropylene (PP), linear low density polyethylene (LLDPE), polystyrene (PS), polyvinyl chloride (PVC), polyethylene terephthalate (PET). It will be appreciated that in one or more embodiments, the inlet stream 101 may comprise rubber for conversion into value added hydrocarbon products. In one or more embodiments, the inlet stream 101 specifically includes one or more chlorinated hydrocarbons, such as PVC. It will be appreciated that utilization of the mixed plastics feedstock allows for recycling of plastics without necessitating fine sorting of the plastics.

TABLE 1

Example Polymers

| Polymer family | Example polymer | Melting Point, °C. | Structure |
|---|---|---|---|
| Olefins | Polyethylene (PE) | 115-135 | |
| Olefins | Polypropylene (PP) | 115-135 | |
| carbonates | diphenylcarbonate | 83 | |
| aromatics | Polystyrene (PS) | 240 | |
| Sulfones | Polyether sulfone | 227-238 | |
| Fluorinated hydrocarbons | Polytetrafluoroethylene (PTFE) | 327 | |
| Chlorinated hydrocarbons | Polyvinyl chloride (PVC) | 100-260 | |
| Acyrilnitriles | Polyacrylonitrile (PAN) | 300 | |

The plastics of the inlet stream 101 may be provided in a variety of different forms. The plastics may be in the form of a powder in smaller scale operations. The plastics may be in the form of pellets, such as those with a particle size of from 1 to 5 millimeter (mm) for larger scale operations. In further embodiments, the plastics may be provided as a chopped or ground product. Further, the plastics of the inlet stream 101 may be natural, synthetic or semi-synthetic polymers. In various embodiments, the plastics of the inlet stream 101 may comprise waste plastic, manufacturing off-spec product, new plastic products, unused plastic products, as well as their combinations.

Dechlorination

The dechlorination unit 20 melts the plastic feedstock of the inlet stream 101 to remove or reduce the chlorine content of the plastic feedstock. As a result, the generated liquid plastic feedstock 110 has a reduced chlorine concentration. Dechlorination of the inlet stream 101 before passage to plastic pyrolysis operations in the pyrolysis reactor 50 is desirable as unprocessed plastics may cause corrosion problems as well as result in contamination of product stream with chlorinated organics during pyrolysis. Removal of chlorine reduces corrosion and product contamination as a result of the presence of chlorinated organics. The dechlorination operation includes raising the temperature of the plastic feedstock to melt the plastic feedstock and generate the liquid plastic stream 110 as well as scrubbing HCl released from the plastic feedstock of the inlet steam 101.

In one or more embodiments, the temperature of the inlet stream 101 is raised to a temperature between 250 and 350° C. to allow for dechlorination in the form of HCl release. In various further embodiments, the temperature of the inlet stream 101 is raised to a temperature between 250 and 325° C., 275 and 350° C., 275 and 325° C., or 300 and 350° C. It will be appreciated that accurate temperature control to maintain the desired temperature range ensures that only HCl release occurs and cracking of C—H bonds and C—C bonds is restrained in the dechlorination operation.

In one or more embodiments, the HCl released from the liquid plastic stream is transferred as an HCl rich stream 112 which is scrubbed to remove the HCl. The HCl rich stream 112 includes HCl in addition to other gases such as mono aromatics, hydrogen, methane, and C2-C5 gases. In various embodiments, the HCl can be scrubbed with water or a sodium hydroxide solution. Scrubbing of HCl with water operates on the principle that hydrochloric acid is formed when HCl gas is dissolved in water. As such, the HCl rich stream 112 may be passed through water to remove HCl gas and generate hydrochloric acid within the water. Scrubbing with a sodium hydroxide solution operates on the principle that HCl can be neutralized by a caustic reagent such as sodium hydroxide to produce benign sodium chloride. In operation the HCl rich stream 112 is flowed in a countercurrent manner to a liquid stream such as water or a sodium hydroxide solution where the above noted reaction occurs to remove the HCl gas from the HCl rich stream 112. However, it will be appreciated that one skilled in the art will be familiar with additional HCl scrubbing techniques, such as an ejector venture gas scrubber, which may additionally or alternatively be utilized in accordance with the present disclosure. In one or more embodiments, the HCl released from the liquid plastic stream may be scrubbed within the dechlorination unit 20. For example, HCl can be scrubbed within the dechlorination unit 20 using adsorbents such as $Al_2O_3$ and zeolites as well as chemical removers. Example chemical removed include Ca-based adsorbents such as $Ca(OH)_2$, CaO, $CaC_3$, and lime; Na-based adsorbents such as $NaHCO_3$ or $Na_2CO_3$; metal oxides such as MgO, $Al_2O_3$, $SiO_2$, PbO, ZnO, FeO, $Fe_2O_3$, and red mud; and lanthanide oxides such as $La_2O_3$, $Nd_2O_3$, $CeO_2$ on $NaHCO_3$, CaO, and $Na_2CO_3$-ZnO.

In one or more embodiments, the dechlorination unit 20 includes a melting reactor 22 and an HCl scrubber 24 to perform the functions of raising the temperature of the plastic feedstock to melt the plastic feedstock and scrub the HCl rich stream 112 respectively. In further embodiments, a single unit forming the dechlorination unit 20 achieves both melting of the plastic feedstock to release HCl as well as scrubbing the generated HCl.

Plastic Pyrolysis

The pyrolysis reactor 50 converts the liquid plastic stream 110 to gaseous products and residual solid material. The gaseous products are provided as an effluent from the pyrolysis reactor 50 as the stream of hydrocarbon vapors 150. The stream of gaseous products includes components which vaporized at a temperature less than the operating temperature of the pyrolysis reactor 50 including various species such as hydrogen and hydrocarbon gases ($C_1$-$C_4$), carbon monoxide (CO), carbon dioxide ($CO_2$), and other acid gases along with naphtha, middle, and heavy fractions. The generated solid material represents the components of the liquid plastic stream 110 which do not vaporize at less than the operating temperature of the pyrolysis reactor is generically shown in the various figures as solids stream 108.

The specific reactor used as the pyrolysis reactor 50 can be of different types and are not limited for the purposes of the present disclosure. One skilled in the art will appreciate that typical reactor types that can be used to serve the function of the pyrolysis reactor 50 are tank reactors, rotary kilns, packed beds, bubbling and various embodiments, the pyrolysis of the liquid plastic stream 110 is performed in the presence or absence of a pyrolysis catalyst at a temperature of 300 to 1,000° C. In various further embodiments, the pyrolysis reactor 50 may operate at a low severity at a temperature less than or equal to 450° C., at a high severity at a temperature at a temperature greater than 450° C., at a temperature of 400 to 600° C., at a temperature of 400 to 500° C., at a temperature of 400 to 450° C., at a temperature of 450 to 500° C., or at a temperature of 425 to 475° C. In various embodiments, the pyrolysis reactor 50 may operate at a pressure in the range of 1 to 100 bars, 1 to 50 bars, 1 to 25 bars, or 1 to 10 bars. Further, in various embodiments, the residence time of the plastic feedstock in the liquid plastic stream 110 in the pyrolysis reactor 50 may be 1 to 3600 seconds, 60 to 1800 seconds, or 60 to 900 seconds.

Acid Gas and Inorganic Removal

The acid gas removal reactor 60 includes a reaction vessel 62 with a solid inorganic alkali salt 64 disposed within the reaction vessel 62. The solid inorganic alkali salt 64 removes residual HCl and sulfur-containing compounds such as $H_2S$ from the hydrocarbon vapors 150 to generate the plastic derived oil 160. Examples of the solid inorganic alkali salt include sodium bicarbonate, sodium carbonate, sodium hydroxide, lime, or a combination thereof such as a mixture of sodium bicarbonate and lime. The reaction of HCl and $H_2S$ generates metal chlorides, metal sulfates, and water. The metal chlorides and sulfates are solids and stay in the reaction vessel 62, while the water goes out as steam with other gaseous hydrocarbons. Other acidic gases such as CO and $CO_2$ are expelled along with the other gaseous hydrocarbons.

In various embodiments, the gas removal reactor 60 may operate as a fluidized bed, a fixed bed, a moving bed, or a packed bed reactor system. As such, the solid inorganic alkali salt 64 may be provided as pellets or a powder.

As previously indicated, the solid inorganic alkali salt 64 within the acid gas removal reactor 60 removes residual HCl and sulfur-containing compounds from the hydrocarbon vapors 150 to generate the plastic derived oil 160. In one or more embodiments, the plastic derived oil comprises less than 3 ppmw total chlorine-containing compounds. In one or more embodiments, the plastic derived oil comprises less than 500 ppmw of sulfur-containing compounds. It will be appreciated that in one or more embodiments, the plastic derived oil comprises less than 3 ppmw total chlorine-containing compounds and less than 500 ppmw of sulfur-containing compounds.

Steam Enhanced Catalytic Cracking

The steam enhanced catalytic cracking reactor 80 cracks the plastic derived oil 160 to generate the product stream 180 comprising light olefins having a carbon number of $C_2$-$C_4$ and aromatics. Catalytic cracking is an understood conversion processes used in petroleum refineries and is utilized to convert the high-boiling, high-molecular weight hydrocarbon fractions of petroleum crude oils or other hydrocarbon stream into more valuable gasoline, olefinic gases, and other products. Similarly, steam cracking is an understood conversion processes used in petroleum refineries where a gaseous or liquid hydrocarbon feed such as naphtha diluted with steam and briefly heated in a furnace in the absence of oxygen to crack saturated hydrocarbons into smaller, often unsaturated, hydrocarbons such as olefins. The processing in accordance with the present disclosure is steam enhanced catalytic cracking which combines the benefits of both catalytic cracking and steam cracking by combining the plastic derived oil 160 with the steam feed 170 prior to entering the steam enhanced catalytic cracking reactor 80 to maximize the production of light olefins.

It will be appreciated that the operations of at least the dechlorination unit 20 and acid gas removal reactor 60 allow for the plastic derived oil 160 to be provide as the feedstream to the steam enhanced catalytic cracking reactor 80 without a hydroprocessing step or operation. As such, in one or more embodiments, hydroprocessing of the plastic derived oil 160 or any other disclosed process stream is explicitly excluded. Specifically, the lack of hydroprocessing is made possible as a result of the effectiveness of the processes of the present disclosure to remove contaminants such as HCl that would otherwise pose a problem to downstream equipment.

The steam enhanced catalytic cracking reactor 80 may operate as a fluidized bed reactor, a fixed bed reactor, or a moving bed reactor. In one or more particular embodiments, the steam enhanced catalytic cracking reactor 80 may comprises a fluidized bed reactor in the form of a riser reactor or a downer reactor to convert the plastic derived oil 160 to the product stream 180 comprising light olefins having a carbon number of $C_2$-$C_4$ and aromatics. As used herein, the term "downer" refers to catalytic cracking reactor, such as a fluidized bed reactor, where the reactant flows in a generally downward direction such as, for example, entering the top and exiting the bottom of the reactor. Likewise, the term "riser" refers to a catalytic cracking reactor, such as a fluidized bed reactor, where the reactant flows in a generally upward direction such as, for example, entering the bottom and exiting the top of the reactor.

In one or more embodiments, the steam enhanced catalytic cracking reactor 80 may include a reactor/separator as well as a regeneration vessel for regenerating spent catalyst. As used herein, "spent catalyst" refers to catalyst which has undergone reaction with fuel and is at least partially coked. Also, as used herein, "regenerated catalyst" refers to catalyst that is exiting the catalyst regenerator and is at least partially or substantially free of coke, and "fresh catalyst" refers to catalyst that is newly entering the system and is at least partially or substantially free of coke. The plastic derived oil 160 is admixed and intimately contacted with an effective quantity of heated fresh or regenerated solid cracking catalyst particles which catalytically crack relatively large hydrocarbon molecules by carbon-carbon bond cleavage. The catalytically cracked the plastic derived oil 160 and the solid cracking catalyst are separated to form the product stream 180 comprising the plastic derived oil 160 which has been catalytically cracked. The solid cracking catalyst is cycled to the regeneration vessel for regeneration of the catalyst.

In general, the operating conditions for the steam enhanced catalytic cracking reactor 80 in a configuration as a downer FCC unit include: a reaction temperature of from about 600° C. to about 700° C., in certain embodiments about 625° C. to about 700° C., and in further embodiments about 650° C. to about 700° C.; reaction pressure of from about 1 kg/cm$^2$ to about 20 kg/cm$^2$, in certain embodiments about 1 kg/cm$^2$ to about 10 kg/cm$^2$, in further embodiments about 1 kg/cm$^2$ to about 3 kg/cm$^2$; contact time (in the reactor) of from about 0.1 seconds to about 30 seconds, in certain embodiments about 0.1 seconds to about 20 seconds, and in further embodiments about 0.1 seconds to about 10 seconds; a catalyst-to-feed ratio on a weight basis of from about 3:1 to about 60:1, in certain embodiments about 4:1 to about 50:1, and in further embodiments about 6:1 to about 40:1, and a steam-to-feed ratio on a weight basis of from about 1:5 to about 1:1, in certain embodiments about 1:4 to about 1:1, and in further embodiments about 1:4 to about 2:3. It is noted that the flow rate of the catalyst entering the steam enhanced catalytic cracking reactor 80 divided by the flow rate of the plastic derived oil 160 entering the steam enhanced catalytic cracking reactor 80 defines the catalyst-to-feed ratio and the flow rate of the steam feed 170 entering the steam enhanced catalytic cracking reactor 80 divided by the flow rate of the plastic derived oil 160 entering the steam enhanced catalytic cracking reactor 80 defines the steam-to-feed ratio.

Similarly, in general, the operating conditions for the steam enhanced catalytic cracking reactor 80 in a configuration as a riser FCC unit include: a reaction temperature of from about 600° C. to about 700° C., in certain embodiments about 625° C. to about 700° C., and in further embodiments about 650° C. to about 700° C.; reaction pressure of from about 1 kg/cm$^2$ to about 20 kg/cm$^2$, in certain embodiments about 1 kg/cm$^2$ to about 10 kg/cm$^2$, in further embodiments about 1 kg/cm$^2$ to about 3 kg/cm$^2$; contact time (in the reactor) of from about 0.1 seconds to about 30 seconds, in certain embodiments about 2 seconds to about 20 seconds, and in further embodiments about 5 seconds to about 10 seconds; a catalyst-to-feed ratio on a weight basis of from about 3:1 to about 60:1, in certain embodiments about 4:1 to about 50:1, and in further embodiments about 6:1 to about 40:1, and a steam-to-feed ratio on a weight basis of from about 1:10 to about 1:1, in certain embodiments about 1:8 to about 1:1, and in further embodiments about 1:4 to about 2:3. It is noted that the catalyst-to-feed ratio and steam-to-feed ratios may be calculated in the same manner as disclosed for the downer unit.

In various embodiments, the catalyst provided in the steam enhanced catalytic cracking reactor 80 may be a fluid catalytic cracking catalyst based on USY, zeolite beta, or ZSM-5. In one or more specific embodiments, the catalyst provided in the steam enhanced catalytic cracking reactor 80 may be a ZSM-5 formulated catalyst selected for high hydrothermal stability.

In one or more embodiments, the product stream 180 comprises at least 60 weight percent (wt. %) of light olefins and naphtha. It is noted that for purposes of the present disclosure, naphtha represents hydrocarbons with boiling points from 25 to 221° C., middle distillate represents hydrocarbons with boiling points from 221 to 343° C., and heavy distillate represents hydrocarbons with boiling points greater than 343° C. In various further embodiments, the product stream 180 comprises at least 65 wt. % of light olefins and naphtha, at least 70 wt. % of light olefins and naphtha, at least 75 wt. % of light olefins and naphtha, or at least 80 wt. % of light olefins and naphtha. Further, in various embodiments, the product stream 180 comprises at least 40 wt. % of light olefins, at least 45 wt. % of light olefins, at least 48 wt. % of light olefins, or at least 50 wt. % of light olefins. Additionally, in various embodiments, the product stream 180 comprises 1 to 30 wt. % of naphtha, 10 to 30 wt. % of naphtha, 8 to 20 wt. % of naphtha, or 20 to 30 wt. % of naphtha.

In various embodiments, the product stream 180 comprises les than 20 wt. % of middle distillate and heavy distillate, less than 15 wt. % of middle distillate and heavy distillate, less than 10 wt. % of middle distillate and heavy distillate, less than 8 wt. % of middle distillate and heavy distillate, or less than 7 wt. % of middle distillate and heavy distillate.

Figure 2:
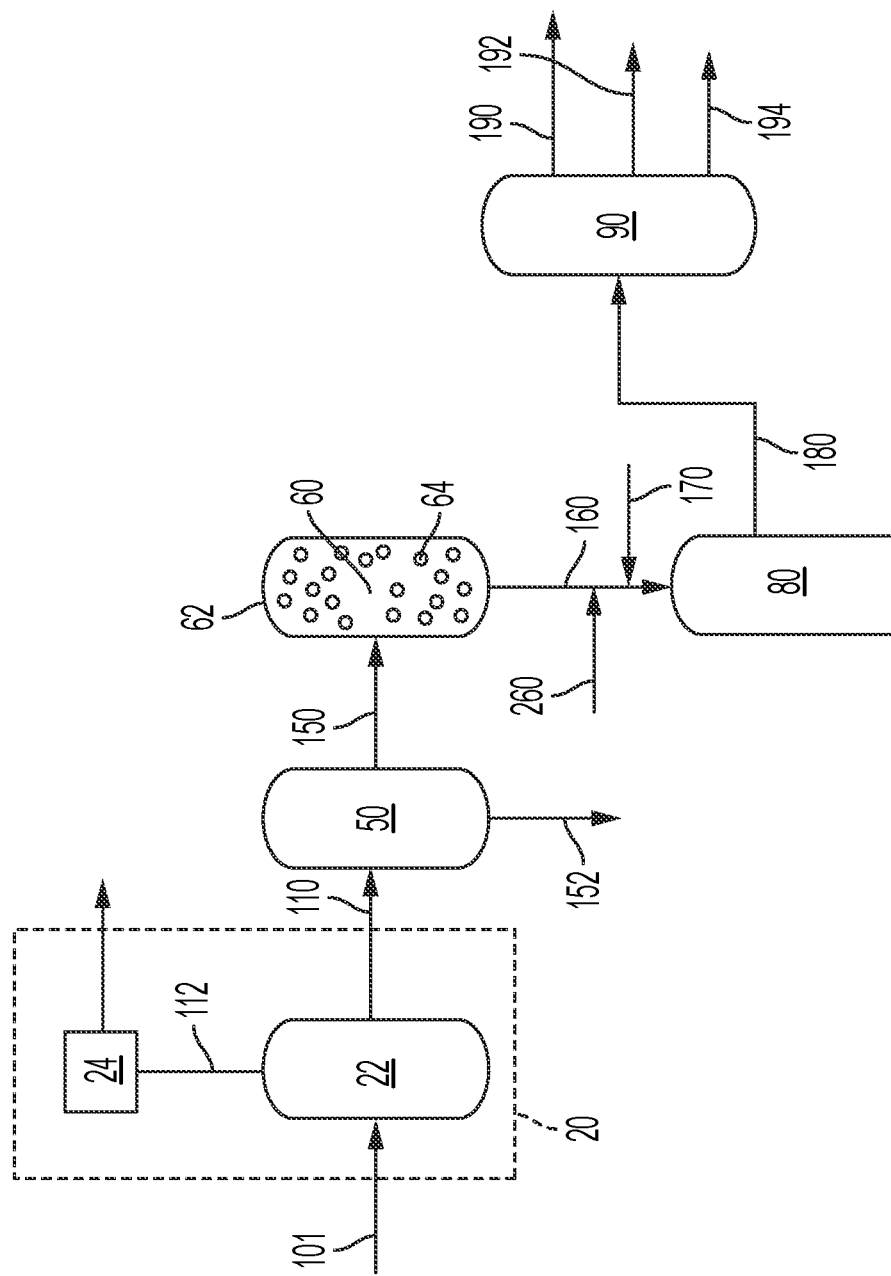
FIG. 2 is a schematic illustration in accordance with FIG. 1 where plastic derived oil is combined with a secondary hydrocarbon stream before steam enhanced catalytic cracking.

In one or more embodiments and with reference to FIG. 2, the plastic derived oil 160 is combined with a secondary hydrocarbon stream 260 for delivery into the steam enhanced catalytic cracking reactor 80 as a single combined stream. Specifically, the composition of plastic derived oil 160 in the single combined stream as fed to the steam enhanced catalytic cracking reactor 80 may vary from 0.1 weight percent (wt. %) to 100 wt. % with the remainder comprising the secondary hydrocarbon stream. In various embodiments, the composition of plastic derived oil 160 in the single combined stream as fed to the steam enhanced catalytic cracking reactor 80 may comprise 0.1 to 100 wt. % plastic derived oil, 20 to 100 wt. % plastic derived oil, 40 to 100 wt. % plastic derived oil, 60 to 100 wt. % plastic derived oil, 80 to 100 wt. % plastic derived oil, or substantially 100 wt. % plastic derived oil. In one or more embodiments, the secondary hydrocarbon stream 260 may be selected from hydrocracker bottoms, virgin or hydrotreated vacuum gas oil, deasphalted oil (DAO), coker gas oil, cycle oil, visbreaker oil, atmospheric residue. It is further noted, that the catalyst-to-feed ratio to the steam enhanced cracking reactor 80 is alternatively calculated as the flow rate of the catalyst entering the steam enhanced catalytic cracking reactor 80 divided by the flow rate of the single combined stream of plastic derived oil 160 and secondary hydrocarbon stream 260 entering the steam enhanced catalytic cracking reactor 80 when the secondary hydrocarbon stream 260 is included. Similarly, it is further noted, that the steam-to-feed ratio to the steam enhanced cracking reactor 80 is alternatively calculated as the flow rate of the steam feed 170 entering the steam enhanced catalytic cracking reactor 80 divided by the flow rate of the single combined stream of plastic derived oil 160 and secondary hydrocarbon stream 260 entering the steam enhanced catalytic cracking reactor 80 when the secondary hydrocarbon stream 260 is included.

Figure 3:
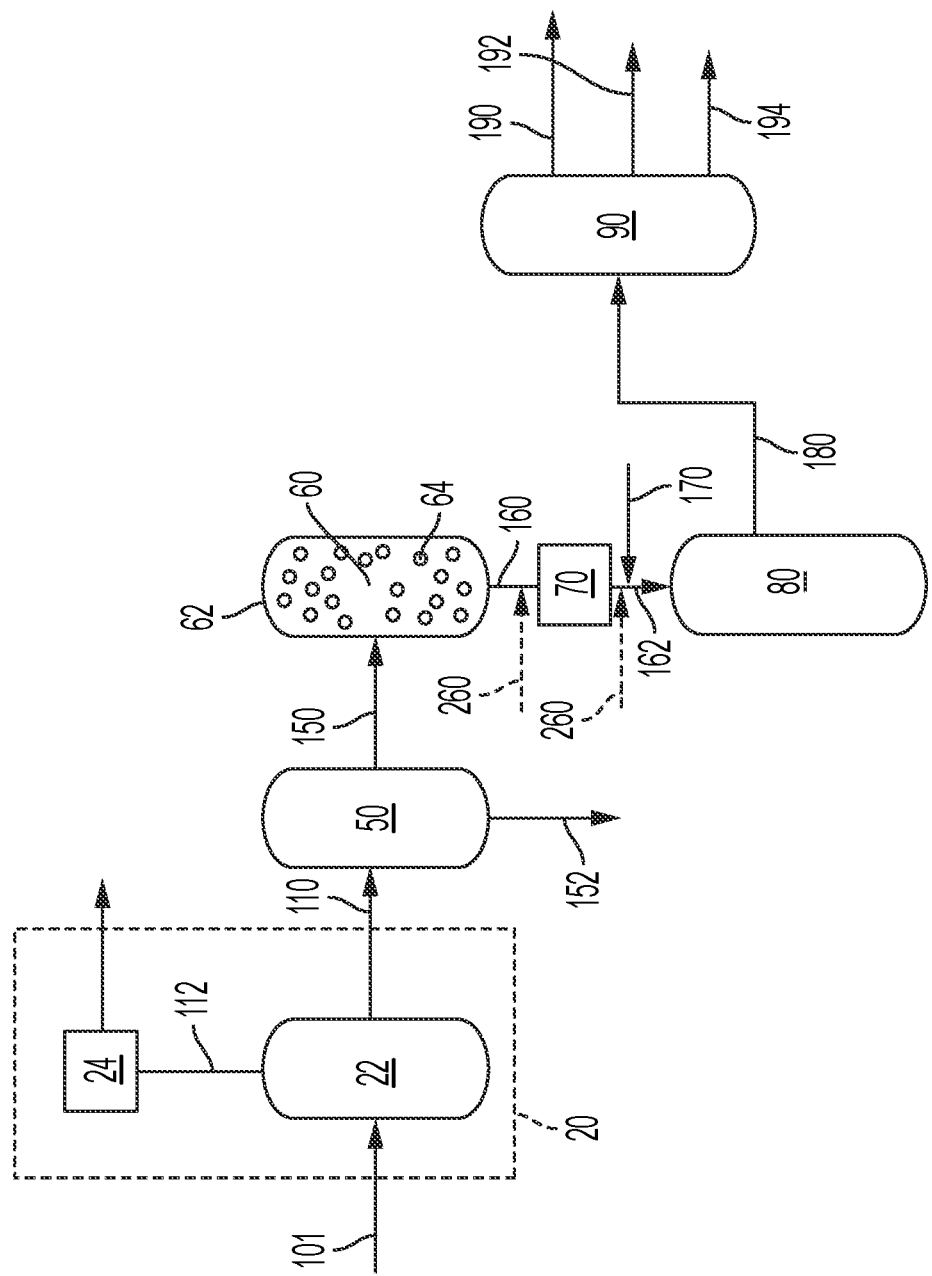
FIG. 3 is a schematic illustration in accordance with FIG. 1 or FIG. 2 where the plastic derived oil undergoes a demetallization operation before steam enhanced catalytic cracking.

With reference to FIG. 3, in one or more embodiments, the plastic derived oil 160 may be provided to a demetallization operation 70 to remove metallic constituents from the plastic derived oil 160 and generate a stream of demetallized plastic derived oil 162 for provision to the steam enhanced catalytic cracking reactor 80. It will further be appreciated that in one or more embodiments, the demetallization operation 60 may be positioned subsequent to the juncture of the plastic derived oil 160 and the secondary hydrocarbon stream 260 such that the constituents of both the plastic derived oil 160 and the secondary hydrocarbon stream 260 undergo demetallization prior to introduction to the steam enhanced catalytic cracking reactor 80.

In one or more embodiments, the demetallization operation 70 may be catalytic hydrodemetallization. U.S. Pat. No. 8,491,779, incorporated by reference, teaches the integration of catalytic hydrodemetallization (HDM) into a refinery process. The HDM step is carried out in the presence of a catalyst and hydrogen. Further, in one or more embodiments, the hydrogen that is used can come from a downstream step. The HDM is generally carried out at 370 to 450° C. and pressure of 30 to 200 bars. Also, see U.S. Pat. No. 5,417,846, incorporated by reference, teaching HDM, as well as U.S. Pat. Nos. 4,976,848; 4,657,664; 4,166,026; and 3,891,541, all of which are incorporated by reference.

In one or more embodiments, the demetallization operation 70 may be solvent deasphalting. The process of solvent deasphalting results in the metal containing hydrocarbons of the processed streaming end up in an asphaltenes stream of a solvent deasphalting unit. U.S. Pat. No. 7,566,394, incorporated by reference, teaches details of a solvent deasphalting process.

Product Separation

With reference to FIG. 1, in one or more embodiments, system for processing mixed plastics into aromatics and light olefins further comprises a separation unit 90 provided in fluid communication with the steam enhanced catalytic cracking reactor 80. The separation unit 90 is operable to generate a light olefin product stream 190 comprising olefins having a carbon number of $C_2$-$C_4$ and an aromatics product stream 192 comprising aromatics from the product stream 180. Additional product streams, such as gasoline, may also be generated which are generically illustrated as additional product streams 194 and 196. It will be appreciated that further additional product streams may be generated from product stream 180, but only additional product streams 194 and 196 are illustrated for conciseness.

The separation unit 90 may comprise any unit operation or system known to those skilled in the art for separating a hydrocarbon stream by vapor pressure. An example separation unit 90 is an atmospheric distillation unit. An atmospheric distillation unit utilizes fractional distillation by heating the feed to a temperature at which one or more fractions of the mixture will vaporize while leaving other fractions as liquid to separate the feed stream. Further, in various embodiments, the separation unit 90 may be a simple flash column or true boiling point distillation with at least 15 theoretical plates.

EXAMPLES

The various embodiments of methods and systems for producing aromatics and light olefins from a mixed plastics stream will be further clarified by the following examples. The examples are illustrative in nature, and should not be understood to limit the subject matter of the present disclosure.

Example Plastic Derived Oil

A plastic feed 101 comprising a mixture of polyethylene, polypropylene, polystyrene, polyethylene terephthalate and polyvinyl chloride was provided to a dechlorination unit 20 and heated to a temperature in the range of 250 to 350° C. to melt the plastic feed and release HCl in accordance with the present disclosure. Dehyrochlorination was achieved by holding the melted plastic waste at 250 to 350° C. for about 1 hours to allow for dehydrochlorination of PVC via the release of HCl. The resulting liquid plastic stream with HCl reduction was transferred to a pyrolysis reactor 50 in accordance with the present disclosure and heated to a temperature of 400 to 450 ° C. to generate hydrocarbon vapors of hydrocarbons volatilized at temperatures of less than the operating temperature. Subsequently, the vapors of hydrocarbons generated in the pyrolysis reactor 50 were treated with dolomite, a mixture of magnesium and calcium carbonate, in an acid gas removal reactor 60 in accordance with the present disclosure to generate the plastic derived oil utilized for generation of light olefins and aromatics. The composition of the plastic derived oil is presented Table 2.

TABLE 2

Plastic Derived Oil Composition

| Composition | Unit | Value |
| --- | --- | --- |
| Naphtha (25-221° C.) | wt. % | 46.3 |
| Middle Distillate (221-343° C.) | wt. % | 40.0 |
| Heavy Distillate (343+° C.) | wt. % | 13.6 |

Inventive Examples

The plastic derived oil, properties of which are given in Table 2, was steam enhanced catalytically cracked in a lab scale fixed bed catalytic cracking unit. The plastic derived oil was cracked at 675° C. with a 10 second residence time, and a nominal steam-to-feed ratio of 0.5 (flow of steam divided by flow of plastic derived oil). Specifically, a constant feed rate of 2 grams per hour (g/h) of plastic derived oil and 1 g/h of water were fed to the fixed bed catalytic cracking unit using metering pumps. Prior to entering the reactor tube, water was preheated up to 250° C. in the pre-heating section. Plastic derived oil, introduced from the top of the reactor, was mixed with steam in the top two-third of the reactor tube before reaching the catalyst bed. Nitrogen was used as a carrier gas at 65 mL/min. Further, 1 gram of catalyst of 30 to 40 mesh size were placed at the center of the reactor tube, supported by quartz wool and a reactor insert. The catalyst bed height was 1 to 2 cm. The reaction was allowed to take place for 45 to 60 minutes, until steady state was reached.

The catalyst used for Inventive Example 1 was Mix75 which is 75% equilibrium catalyst (Ecat) and 25% OlefinsUltra (OU), both commercially available from W.R. Grace and Company (Columbia, Md.). The catalyst used for Inventive Example 2 was HSCCT-AZL-76. HSCCT-AXL-76 includes an active component of metal modified P-ZSM-5 with a catalyst composition of 40 wt % ZSM-5, 20 wt % alumina binder, and 40% wt kaolin matrix. The resulting products from cracking the plastic derived oil using the catalysts in accordance with Inventive Example 1 and Inventive Example 2 are summarized in Table 3.

TABLE 3

Product Yields at 675° C.

| Composition (wt. %) | Inventive Example 1 (Mix75 catalyst) | Inventive Example 2 (HSCCT-AXL-765) |
| --- | --- | --- |
| Fuel gas ($C_1 + H_2$) | 8.1 | 10.6 |
| Saturated $C_2$-$C_4$ | 5.2 | 6.4 |
| $C_2$ alkene | 21.1 | 28.1 |
| $C_3$ alkene | 20.5 | 26.7 |
| $C_4$ alkene | 11.5 | 8.1 |
| Naphtha (25-221° C.) | 26.6 | 13.4 |
| Middle Distillate (221-343° C.) | 4.3 | 3.2 |
| Heavy Distillate (343+° C.) | 0.6 | 0.5 |
| Coke | 2.0 | 2.8 |

As seen in Table 3, substantial light olefins and naphtha from which aromatics can be extracted were generated from directly cracking the plastic derived oil. Specifically, a yield of 53.1 wt. % light olefins (as measured by the total of ethylene, propylene, and butylenes) and 26.6 wt. % of naphtha was generated from cracking the plastic derived oil in Inventive Example 1. Further, a yield of 62.9 wt. % light olefins (as measured by the total of ethylene, propylene, and butylenes) and 13.4 wt. % of naphtha was generated from cracking the plastic derived oil in Inventive Example 2. Further, the yield of middle distillate, heavy distillate, and coke was reduced to less than 7 wt. % in the products from 53.6 wt. % in the plastic derived oil demonstrating a shift toward desirable value-added products.

Continued utility and improvement were demonstrated at cracking temperatures less than 675° C. with Inventive Example 3 and Inventive Example 4 which are duplications of Inventive Example 1 (Mix75 catalyst) at a cracking temperature of 650° C. and 600° C., respectively. The resulting products from cracking the plastic derived oil using the catalysts and processing parameters in accordance with Inventive Example 3 and Inventive Example 4 are summarized in Table 4.

TABLE 4

Product Yields at 650° C. and 600° C.

| Composition (wt. %) | Inventive Example 3 (Mix75 catalyst-650° C.) | Inventive Example 4 (Mix75 catalyst-600° C.) |
| --- | --- | --- |
| Fuel gas ($C_1 + H_2$) | 6.2 | 2.2 |
| Saturated $C_2$-$C_4$ | 5.2 | 3.2 |
| $C_2$ alkene | 18.1 | 8.8 |
| $C_3$ alkene | 24.6 | 24.0 |
| $C_4$ alkene | 14.0 | 16.6 |
| Naphtha (25-221° C.) | 24.9 | 29.9 |
| Middle Distillate (221-343° C.) | 5.0 | 12.1 |
| Heavy Distillate (343+° C.) | 0.7 | 2.6 |
| Coke | 1.2 | 0.4 |

As seen in Table 4, substantial light olefins and naphtha from which aromatics can be extracted were generated from directly cracking the plastic derived oil even at reduced cracking temperatures. Specifically, a yield of 56.7 wt. % and 49.4 wt. % light olefins (as measured by the total of ethylene, propylene, and butylenes) and 24.9 wt. % and 29.9 wt. % of naphtha was generated from cracking the plastic derived oil in Inventive Example 3 and Inventive Example 4, respectively. Further, the yield of middle distillate, heavy distillate, and coke was reduced to less than 16 wt. % in the products in all Inventive Examples from 53.6 wt. % in the plastic derived oil demonstrating a shift toward desirable value-added products.

Based on the foregoing, it should now be understood that various aspects of method and systems for producing aromatics and light olefins from a mixed plastics stream are disclosed herein.

According to a first aspect of the present disclosure, a method of producing aromatics and light olefins from a mixed plastics stream comprises (a) feeding a plastic feedstock to a dechlorination operation, the dechlorination operation comprising: (i) raising the temperature of the plastic feedstock to a temperature between 250 and 350° C. to melt the plastic feedstock and generate a liquid plastic stream and (ii) scrubbing HCl released from the liquid plastic stream; (b) feeding the liquid plastic stream processed in the dechlorination operation to a pyrolysis reactor, the pyrolysis reactor raising the temperature of the liquid plastic stream to a temperature of 300 to 1,000° C. to generate hydrocarbon vapors; (c) feeding the hydrocarbon vapors to an acid gas removal reactor, the acid gas removal reactor comprising a reaction vessel with a solid inorganic alkali salt disposed within the reaction vessel, where the solid inorganic alkali salt removes residual HCl and sulfur-containing compounds from the hydrocarbon vapors to generate a plastic derived oil; and (d) feeding the plastic derived oil to a steam enhanced catalytic cracking reactor operated at 600 to 700° C. where the plastic derived oil is cracked to generate a product stream comprising light olefins having a carbon number of $C_2$-$C_4$ and aromatics.

A second aspect includes the method of the first aspect, in which the plastic feedstock comprises mixed plastics of differing compositions.

A third aspect includes the method of the first or second aspects, in which the plastic feedstock comprises the plastic feedstock comprises two or more plastics selected from olefins, carbonates, aromatic polymers, sulfones, fluorinated hydrocarbon polymers, chlorinated hydrocarbon polymers, and acrylonitriles or two or more plastics selected from HDPE, LDPE, PP, LLDPE, PS, PVC, and PET.

A fourth aspect includes the method of any of the first through third aspects, in which the HCl released from the liquid plastic stream is scrubbed with water or a sodium hydroxide solution.

A fifth aspect includes the method of any of the first through fourth aspects, in which the solid inorganic alkali salt comprises sodium bicarbonate, sodium carbonate, sodium hydroxide, lime, or a combination thereof.

A sixth aspect includes the method of any of the first through fifth aspects, in which the plastic derived oil comprises less than 3 ppmw total chlorine-containing compounds.

A seventh aspect includes the method of any of the first through sixth aspects, in which the plastic derived oil comprises less than 500 ppmw of sulfur-containing compounds.

An eighth includes the method of any of the first through seventh aspects, in which where the plastic derived oil is combined with a secondary hydrocarbon stream for delivery into the steam enhanced catalytic cracking reactor as a single combined stream, the secondary hydrocarbon stream selected from hydrocracker bottoms, virgin or hydrotreated vacuum gas oil, deasphalted oil (DAO), coker gas oil, cycle oil, visbreaker oil, atmospheric residue.

A ninth aspect includes the method of any of the first through eighth aspects, in which the method further comprises feeding the product stream to a separation unit to generate a light olefin product stream comprising olefins having a carbon number of $C_2$-$C_4$ and an aromatics product stream comprising aromatics.

A tenth aspect includes the method of any of the first through ninth aspects, in which the product stream comprises at least 60 wt. % of light olefins and naphtha, the naphtha representing hydrocarbons with boiling points from 25 to 221° C.

An eleventh aspect includes the method of any of the first through tenth aspects, in which the product stream comprises at least 40 wt. % of light olefins.

A twelfth aspect includes the method of any of the first through eleventh aspects, in which the product stream comprises less than 20 wt. % of hydrocarbons having a boiling point greater than 221° C.

According to a thirteenth aspect of the present disclosure, a system for processing mixed plastics into aromatics and light olefins comprises an inlet stream comprising mixed plastics; a dechlorination unit, the dechlorination unit in fluid communication with the inlet stream and operable to (i) raise the temperature of the inlet stream to a temperature between 250 and 350° C. to melt the mixed plastics and generate a liquid plastic stream and (ii) scrub HCl released from the inlet stream; a pyrolysis reactor, the pyrolysis reactor in fluid communication with the liquid plastic stream discharged from the dechlorination unit and operable to raise the temperate of the liquid plastic stream to a temperature of 300 to 1,000° C. to generate hydrocarbon vapors; an acid gas removal reactor, the acid gas removal reactor in fluid communication with the pyrolysis reactor and operable to remove residual HCl and sulfur-containing compounds from the hydrocarbon vapors to generate a plastic derived oil, where the acid gas removal reactor comprises a reaction vessel with a solid inorganic alkali salt disposed within the reaction vessel; and a steam enhanced catalytic cracking reactor, the steam enhanced catalytic cracking reactor in fluid communication with the acid gas removal reactor and operable to crack the plastic derived oil at 600 to 700° C. to generate a product stream comprising light olefins having a carbon number of $C_2$-$C_4$ and aromatics.

A fourteenth aspect includes the system of the thirteenth aspect, in which the inlet stream comprises two or more plastics selected from olefins, carbonates, aromatic polymers, sulfones, fluorinated hydrocarbon polymers, chlorinated hydrocarbon polymers, and acrylonitriles or two or more plastics selected from HDPE, LDPE, PP, LLDPE, PS, PVC, and PET.

A fifteenth includes the system of the thirteenth or fourteenth aspect, in which the dechlorination unit comprises water or a sodium hydroxide solution to scrub the HCl released from the liquid plastic stream.

A sixteenth aspect includes the system of any of the thirteenth through fifteenth aspects, in which the solid inorganic alkali salt comprises sodium bicarbonate, sodium carbonate, sodium hydroxide, lime, or a combination thereof.

A seventeenth aspect includes the system of any of the thirteenth through sixteenth aspects, in which the plastic derived oil comprises less than 3 ppmw total chlorine-containing compounds.

An eighteenth aspect includes the system of any of the thirteenth through seventeenth aspects, in which the plastic derived oil comprises less than 500 ppmw of sulfur-containing compounds.

A nineteenth aspect includes the system of any of the thirteenth through eighteenth aspects, in which the system further comprises a secondary hydrocarbon stream in fluid communication with the plastic derived oil such that the plastic derived oil is combined with the secondary hydrocarbon stream for delivery into the steam enhanced catalytic cracking reactor as a single combined stream, where the secondary hydrocarbon stream selected from hydrocracker bottoms, virgin or hydrotreated vacuum gas oil, deasphalted oil (DAO), coker gas oil, cycle oil, visbreaker oil, atmospheric residue.

A twentieth aspect includes the system of any of the thirteenth through nineteenth aspects, in which the system further comprises a separation unit in fluid communication with the steam enhanced catalytic cracking reactor operable to generate a light olefin product stream comprising olefins having a carbon number of $C_2$-$C_4$ and an aromatics product stream comprising aromatics from the product stream.

A twenty-first aspect includes the system of any of the thirteenth through twentieth aspects, in which the product stream comprises at least 60 wt. % of light olefins and naphtha, the naphtha representing hydrocarbons with boiling points from 25 to 221° C.

A twenty-second aspect includes the system of any of the thirteenth through twenty-first aspects, in which the product stream comprises at least 40 wt. % of light olefins.

A twenty-third aspect includes the system of any of the thirteenth through twenty-second aspects, in which the product stream comprises less than 20 wt. % of hydrocarbons having a boiling point greater than 221° C.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned. For brevity, the same is not explicitly indicated subsequent to each disclosed range and the present general indication is provided.

As used in this disclosure and in the appended claims, the words "comprise," "has," and "include" and all grammatical variations thereof are each intended to have an open, non-limiting meaning that does not exclude additional elements or steps.

What is claimed is:

1. A method of producing aromatics and light olefins from a mixed plastics stream, the method comprising:
   (a) feeding a plastic feedstock to a dechlorination operation, the dechlorination operation comprising:
      (i) raising the temperature of the plastic feedstock to a temperature between 250 and 350° C. to melt the plastic feedstock and generate a liquid plastic stream; and
      (ii) scrubbing HCl released from the liquid plastic stream;
   (b) feeding the liquid plastic stream processed in the dechlorination operation to a pyrolysis reactor, the pyrolysis reactor raising the temperature of the liquid plastic stream to a temperature of 300 to 1,000° C. to generate hydrocarbon vapors;
   (c) feeding the hydrocarbon vapors to an acid gas removal reactor, the acid gas removal reactor comprising a reaction vessel with a solid inorganic alkali salt disposed within the reaction vessel, where the solid inorganic alkali salt removes residual HCl and sulfur-containing compounds from the hydrocarbon vapors to generate a plastic derived oil; and
   (d) feeding the plastic derived oil to a steam enhanced catalytic cracking reactor operated at 600 to 700° C. where the plastic derived oil is cracked to generate a product stream comprising light olefins having a carbon number of $C_2$-$C_4$ and aromatics.

2. The method of claim 1, where the plastic feedstock comprises mixed plastics of differing compositions.

3. The method of claim 1, where the plastic feedstock comprises the plastic feedstock comprises two or more plastics selected from olefins, carbonates, aromatic polymers, sulfones, fluorinated hydrocarbon polymers, chlorinated hydrocarbon polymers, and acrylonitriles or two or more plastics selected from HDPE, LDPE, PP, LLDPE, PS, PVC, and PET.

4. The method of claim 1, where the HCl released from the liquid plastic stream is scrubbed with water or a sodium hydroxide solution.

5. The method of claim 1, where the solid inorganic alkali salt comprises sodium bicarbonate, sodium carbonate, sodium hydroxide, lime, or a combination thereof.

6. The method of claim 1, where the plastic derived oil comprises less than 3 ppmw total chlorine-containing compounds.

7. The method of claim 1, where the plastic derived oil comprises less than 500 ppmw of sulfur-containing compounds.

8. The method of claim 1, where the plastic derived oil is combined with a secondary hydrocarbon stream for delivery into the steam enhanced catalytic cracking reactor as a single combined stream, the secondary hydrocarbon stream selected from hydrocracker bottoms, virgin or hydrotreated vacuum gas oil, deasphalted oil (DAO), coker gas oil, cycle oil, visbreaker oil, atmospheric residue.

9. The method of claim 1, where the method further comprises feeding the product stream to a separation unit to generate a light olefin product stream comprising olefins having a carbon number of $C_2$-$C_4$ and an aromatics product stream comprising aromatics.

10. The method of claim 1, where the product stream comprises at least 60 wt. % of light olefins and naphtha, the naphtha representing hydrocarbons with boiling points from 25 to 221° C.

11. The method of claim 10, where the product stream comprises at least 40 wt. % of light olefins.

12. The method of claim 10, where the product stream comprises less than 20 wt. % of hydrocarbons having a boiling point greater than 221° C.

* * * * *